(12) United States Patent
L'Heureux et al.

(10) Patent No.: US 12,723,945 B2
(45) Date of Patent: Sep. 1, 2026

(54) VISUAL FAULT LOCATOR (VFL) WITH VARIABLE GAIN CONTROL

(71) Applicant: EXFO Inc., Québec (CA)

(72) Inventors: Mario L'Heureux, Lévis (CA); Michel Leclerc, Québec City (CA)

(73) Assignee: EXFO Inc., Quebec (CA)

( * ) Notice: Subject to any disclaimer, the term of this patent is extended or adjusted under 35 U.S.C. 154(b) by 177 days.

(21) Appl. No.: 18/664,669

(22) Filed: May 15, 2024

(65) Prior Publication Data

US 2024/0385076 A1 Nov. 21, 2024

Related U.S. Application Data

(60) Provisional application No. 63/466,608, filed on May 15, 2023.

(51) Int. Cl.
*G01M 11/00* (2006.01)

(52) U.S. Cl.
CPC .................................. *G01M 11/30* (2013.01)

(58) Field of Classification Search
CPC .............................. G01M 11/33; G01M 11/30
USPC ........................................................... 356/73
See application file for complete search history.

(56) References Cited

U.S. PATENT DOCUMENTS 10,491,296 B1 * 11/2019 Wellbrock ........... H04B 10/073
10,656,343 B1 * 5/2020 Applebaum ......... G02B 6/4401
2016/0069774 A1 * 3/2016 Hayashi ............... H04B 10/071 356/73.1
2016/0356670 A1 * 12/2016 Brillhart .......... H04B 10/07955
2017/0322111 A1 * 11/2017 Schell ................ G01M 11/3145
2018/0340861 A1 * 11/2018 Schell .................. G01M 11/333
2019/0316987 A1 * 10/2019 Eddy ...................... G01M 11/30
2022/0268665 A1 * 8/2022 Leclerc .................. G01M 11/33

OTHER PUBLICATIONS

Scangrip Innovation from Denmark. Product sheet UK [online]. Flash 600 R product, Item No. 03.5137. Retrieved from the Internet: <URL: https://www.scangrip.com/Files/Images/03.5137/03.5137_flash_600_r_productsheet_uk-high.pdf>.
AFL Test & Inspection, Specification sheet, VFI4 Visual Fault Identifiers, 2021-2022, VFI4-00-2000 Revision AB Apr. 7, 2022, AFLglobal.com.
Shanghai Grandway Telecom Tech. Co. Ltd, VLS-8 Series Mini VFL, Specification sheet, www.grandway.com.cn.

* cited by examiner

*Primary Examiner* — Isiaka O Akanbi
(74) *Attorney, Agent, or Firm* — Baratta Law PLLC; Lawrence A. Baratta, Jr.

(57) ABSTRACT

Systems, methods, and devices for testing for faults in a fiber optic cable are provided. A Visual Fault Locator (VFL), according to one implementation, includes an output port configured for connection with an optical fiber to be tested. The VFL also includes a variable light source configured to emit visible light at different power levels from the output port. For example, the different power levels may correspond with different light intensity levels. In some implementations, the VFL may further include a gain control device connected to the variable light source, whereby the gain control device may be configured to control the power of the variable light source to enable the variable light source to emit the visible light at multiple power levels.

16 Claims, 5 Drawing Sheets

VISUAL FAULT LOCATOR (VFL) WITH VARIABLE GAIN CONTROL

CROSS-REFERENCE

The present disclosure claims priority to U.S. Provisional Patent Application No. 63/466,608, filed May 15, 2023, the contents of which are incorporated by reference in their entirety.

TECHNICAL FIELD

The present disclosure generally relates to systems, methods, and devices for testing optical fibers, such as Visual Fault Locators (VFLs).

BACKGROUND

Fiber optic cables (or optical fibers) are used in communication networks for enabling the propagation of optical signals between network components. In some cases, the fiber optic cables, which form the links or optical communication channels between network nodes, can extend for many miles to allow communication between the nodes remotely separated from each other. When network equipment and fiber optic cables are installed in a network, a technician may use a Visual Fault Locator (VFL) for testing the cables and their connections to network devices. These VFLs, for instance, may also be referred to as visual fault identifiers, visual fault locators, visual fault detectors, visual fault finders, fiber tracers, fiber continuity testers, among other names. Fault testing can be performed to ensure that the fibers are in good condition and are properly connected in the system. In use, the VFL emits light that is visual to the human eye. Thus, when the light is injected into a fiber, the technician can visually detect faults, which will be revealed by light escaping from a break in the fiber, from a defective connector, from a poorly connected fiber, from a sharp bend in the fiber, etc. When these faults are exposed, the technician can easily spot them and take corrective actions. When used with an Optical Time Domain Reflectometry (OTDR) device, a VFL may especially be useful to detect faults in areas referred to as the blind spot or dead zone of the OTDR device.

BRIEF SUMMARY

The present disclosure is directed to Visual Fault Locators (VFLs) and other systems, methods, and devices for testing optical fibers. In particular, the VFLs described herein are capable of operating at different power levels. In one implementation, a VFL includes a) an output port configured for connection with an optical fiber to be tested and b) a variable light source configured to emit visible light at different power levels from the output port. For example, the different power levels may correspond with different light intensity levels. In some embodiments, the VFLs may be incorporated in Live Fiber Detectors (LFDs), photonic multiplexing/demultiplexing components, photonic network components, or other devices.

According to additional embodiments, the VFL may also include a gain control device connected to the variable light source. The gain control device, for example, may be configured to control the power of the variable light source to enable the variable light source to emit the visible light at multiple power levels. The multiple power levels, for instance, may include one or more lower levels below class 2M and one or more high levels from class 3R or more. The gain control device may be configured to control the power of the variable light source based on user activity. The gain control device may increase the power of the variable light source from a low level to a high level when the user presses and holds down a boost button. Also, the gain control device may be configured to increase the power from the low level to the high level in multiple steps. The gain control device may also be configured to increase the power from one step to the next when the user continuously holds down the boost button for a predetermined amount of time. Furthermore, the gain control device may be configured to return the power to the low level when the user releases the boost button. In some embodiments, the boost button may also function as an on/off button.

In some embodiments, the VFL may further include one or more input devices for receiving command signals from an external device, whereby the command signals may be configured to control the power level of the variable light source. One input device may include a radio configured to wirelessly receive the command signals from the external device. Before receiving these command signals, the VFL may be configured to perform a pairing procedure to pair the external device with itself. The command signals received from the external device may include at least a continuation input for instructing the variable light source to maintain the power level at an elevated level. For example, the continuation input may be related to user activity associated with the external device. In some implementations, the command signals may be related to remote signals transmitted from a remote device in communication with the external device.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figures 1A, 1B, 1C:
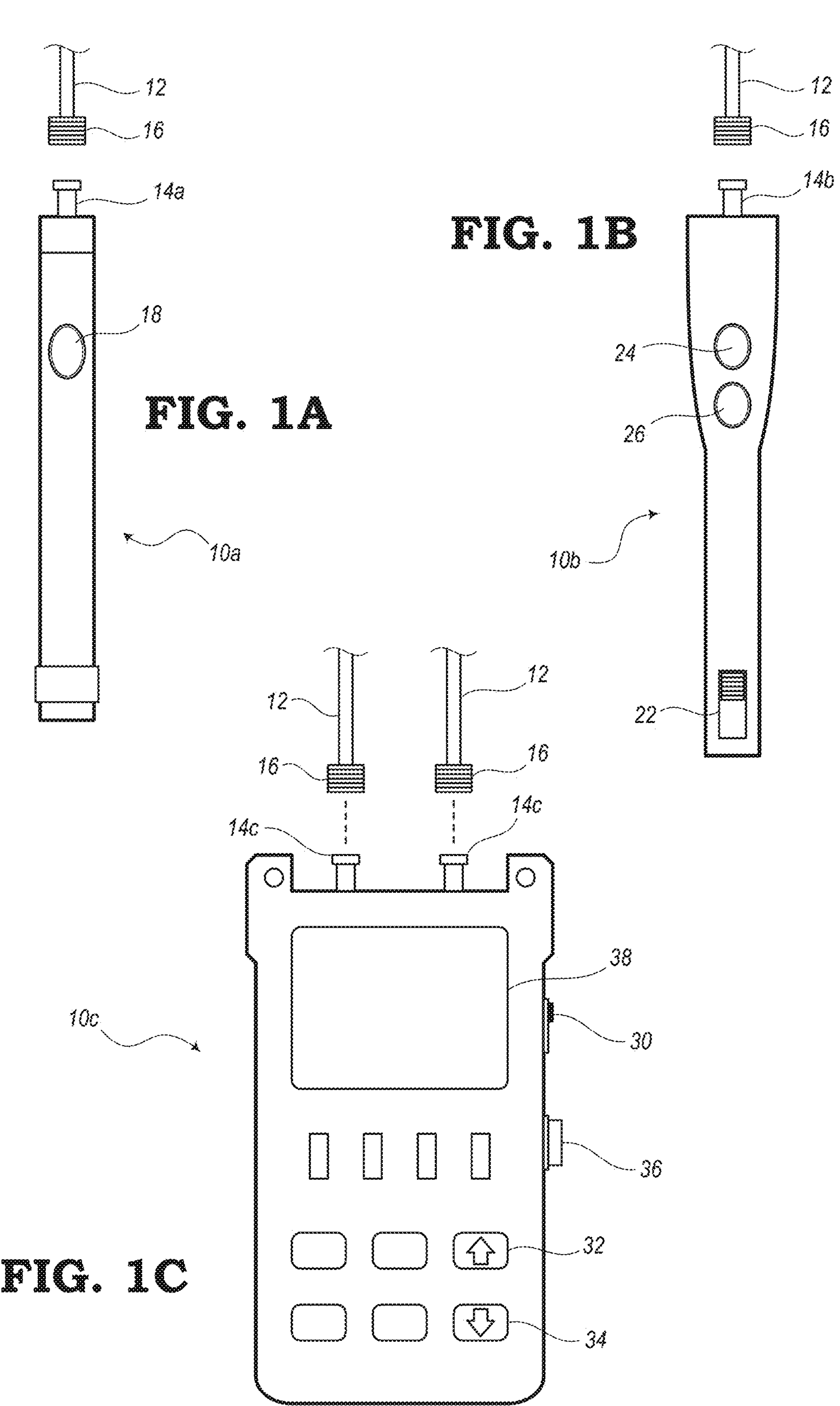
FIGS. 1A-1C are diagrams illustrating the front view of various Visual Fault Locators (VFLs), according to various embodiments.

The present disclosure relates to Visual Fault Locators (VFLs) and other systems and methods for testing faults in optical fibers, identifying optical fibers, and the like, such as those used in communications networks. In the past, VFLs were simple, inexpensive devices that produced low levels of power to enable a light source (e.g., laser) to generate low intensity light, at safe levels. Generally, it was not an issue for a technician to look at any light escaping through the jacket of the fiber. However, at the opposite end of the fiber, where a majority of the laser light would exit, the light generated by the VFL could potentially be harmful if it were accidentally pointed directly into the eyes of the technician. Therefore, extreme caution would be needed during use to prevent damage to the eyes.

On the other hand, testing an extremely long fiber would generally have issues as well. For example, due to attenuation of the light signals as a function of the length of the fiber and the distance that the signals travel, the range of a VFL would be limited. Also, if a VFL is used in a bright environment, such as in direct sunlight, the light from the VFL may not be bright enough, which can affect the ability of the technician to see the light and discover any issues or the ability to identify the lighted fiber link. In these cases, a solution would be to construct a VFL that is able to generate higher power and emit light at a higher intensity level. A problem with this solution, however, is that the higher intensity light can cause permanent damage to human eyes. Not only can these high power devices create a greater risk of eye damage, but also they may exceed various standards and restrictions imposed in different countries.

For example, in many countries, certain laser light classifications are enforced on manufacturers for the protection of consumers or users. Also, different countries have safety regulations for the proper use of devices that incorporate such laser sources. Nevertheless, some users may still wish to use more powerful VFLs despite the safety risks and might even purchase devices that do not comply with the safety regulations within some countries. Most reputable manufacturers, however, will produce VFLs that limit the power output to safe levels, while less reputable manufacturers might offer powerful devices that can be potentially harmful.

The Maximum Permissible Exposure (MPE) is defined as the highest power or energy density (in W/cm2 or J/cm2) of a light source that is considered safe. A "Class 1" laser product is defined as being safe under all conditions of normal use, which means that the MPE cannot be exceeded when viewing the laser light with the naked eye or even when viewing with the aid of magnifying optics. A "Class 1M" laser product is defined as being safe for all conditions of use except when used with magnifying optics. "Class 2" and "Class 2M" laser products are defined as being safe if used with limited exposure as long as the user does not intentionally stare at the light. Classes 2 and 2M are limited to a power output of 1.0 mW. A "Class 3R" laser product is defined as being safe if handled carefully, with restricted beam viewing. With a Class 3R laser, the MPE can be exceeded, but with a low risk of injury. That is, Class 3R devices are limited to 5.0 mW. A "Class 3B" laser product is defined as being hazardous if the eye is directly exposed and usually requires protective eyewear during use. A Class 3B device may have a power output of up to 500.0 mW. A "Class 4" laser product is defined as the highest and most dangerous class of lasers and can cause permanent damage to the eyes and can even burn the skin, even if the beam is diffused. Hence, relatively safe VFLs may be classified as Class 2 or 2M devices, while some VFLs on the market may be classified as Class 3R or 3B devices.

Therefore, there is a need in the field of fiber optic testing for providing a VFL that operates at a safe level but also allows a user to safely increase the power in a controlled manner when extra power is needed. Until now, VFLs on the market are only able to generate light at one power level. If the power level of conventional devices is set too low, then the range may be greatly limited or it may be difficult for the technician to use in certain bright environments. If the power level of conventional devices is set too high, then the device can pose a safety risk to its users. By producing a VFL that can operate at multiple levels, as described in the present disclosure, these improved VFLs can resolve many of the issues of the conventional VFLs.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Form Factors of Various Visual Fault Locators (VFLs)

FIGS. 1A, 1B, and 1C are diagrams illustrating examples of various Visual Fault Locators (VFLs) 10*a*, 10*b*, and 10*c*, respectively, which may be configured as handheld devices. The VFLs 10 are configured to be attached to a near end of a fiber optic cable 12 to be tested. The VFLs 10*a*, 10*b*, 10*c* enable a user to visibly detect faults in the fiber optic cable 12 itself, faults in associated connectors, and faults in other connected downstream equipment, such as network devices associated with an optical communication network. The VFLs 10*a*, 10*b*, 10*c* include output ports 14*a*, 14*b*, 14*c*, respectively, for connection to the fiber optic cable 12 under test. For testing, the output port 14 of the respective VFL 10 is connected to a connector 16 of the fiber optic cable 12. In use, the VFLs 10 are configured to emit light at any wavelength within a range of wavelengths that are optically detectable by a human (e.g., about 380 nm to about 700 nm). For example, the VFLs 10 may emit "red" light having a wavelength of about 650 nm. Also, the VFLs 10 may further include a high-power level indicator such as a visual indicator, e.g., a LED, or a sound indicator, which may be activated whenever the light source emits at high-power level.

Conventional VFLs typically operate at a single power level to produce light at a single intensity level. However, in contrast to conventional VFLs, the VFLs 10 of the present disclosure, according to the various embodiments described herein, are capable of varying the power and hence varying the light intensity emitted from the output ports 14*a*, 14*b*, 14*c* of the respective devices. By enabling this variability of light intensity, the embodiments of the present disclosure are capable of producing light for testing the fiber optic cables 12 at a low level to minimize the risk of damage to the human eye, while also allowing the light intensity to be increased in a safe, controlled manner when the low levels of light might be imperceptible during testing.

The VFLs 10 include a feature of varying the amount of power provided to a light source to thereby vary the light intensity. The systems and methods of the present disclosure may be configured to allow the VFLs 10 to power ON at a low power level to initially emit a low light intensity level. The low light intensity level may be related to a generated output power of about 1.0 mW, which is generally a safe level posing little or no risk to the eyes of the user or other people who may be near the near end of the fiber optic cables 12 and/or near the far end of the fiber optic cables 12 or other downstream fibers or equipment. That is, when the VFL 10 is first powered ON, the intensity of the light may initially be set to a safe level. If, for example, the user determines that the initial intensity level is not strong enough to visually detect faults, the user may increase or boost the power level.

Upon receiving active user input (e.g., pressing and holding down a button), the power levels or light intensity levels can be increased. It may be noted that, for safety reasons, the VFLs 10 can be configured to allow operation at elevated levels as long as the user is continuously performing some action, such as holding down a button. Otherwise, if the user releases the button (or stops performing whatever action is needed to keep the device at the elevated level), then the VFLs 10 may be configured to return back to the low safe level. In other embodiments, however, the VFLs 10 may be configured to enable the user to set the power level at an elevated level and remain at that level (e.g., for a predetermined amount of time) even when the user is not providing the continuous action. In that case, the VFLs 10 may then wait for a predetermined amount of time to pass or wait for the user to perform some other action to return the power back down to the low safe level.

The VFLs 10*a*, 10*b*, 10*c* and other embodiments described in the present disclosure may be configured in any suitable manner to enable a user to increase the power. In some embodiments, the VFLs 10 may be configured to maintain the power at the elevated level only when the user performs a continuous action. Once the continuous action is stopped, then the VFLs 10 may be configured to return to the low safe level. Various embodiments of buttons, switches, etc., along with suitable logic circuitry for performing certain functions in response to user's input with respect to these devices, can be incorporated in the VFLs 10. It should be noted that many different combinations of switches and buttons may be used and may include combinations not necessarily described in the present disclosure but may be anticipated from an understanding of the present disclosure. As such, the present disclosure is configured to include all suitable variations of circuitry for enabling powering the VFLs 10 to an initial power level, enabling user selection of an increased power level, maintaining the VFLs 10 at the elevated power levels for any suitable amounts of time, returning the power level to the initial level or other safe level (e.g., when the user is no longer performing a certain action, like pressing a button), and/or turning the power OFF.

As shown in FIG. 1A, the VFL 10*a* may include a design or form factor that resembles a pen. When the output port 14*a* of the VFL 10*a* is connected to the connector 16 of the fiber optic cable 12 under test, the output port 14*a* is configured to emit the variable-power light to the fiber optic cable 12. In this embodiment, the VFL 10*a* includes a user input button 18, which may be the sole component allowing the user to provide input. As such, the VFL 10*a* may allow the user to press the user input button 18 in order to turn the power ON or OFF. If, for example, the user determines that the initial intensity level is not strong enough to visually detect faults, the user may increase or boost the power level by pressing and holding down the user input button 18 in order to increase the intensity of the light from the output port 14*a*.

As shown in FIG. 1B, the VFL 10*b* may include a design or form factor that resembles a flashlight. When the output port 14*b* of the VFL 10*b* is connected to the connector 16 of the fiber optic cable 12 under test, the output port 14*b* is configured to emit the variable-power light to the fiber optic cable 12. In this embodiment, the VFL 10*b* includes at least an ON/OFF switch 22 and a boost input button 24. When the user turns the power ON using the ON/OFF switch 22, the VFL 10*b* may emit light through the output port 14*b* at a low light intensity level. If, for example, the user determines that the initial intensity level is not strong enough, the user may boost the power level by pressing and holding down the boost input button 24.

Figure 4:
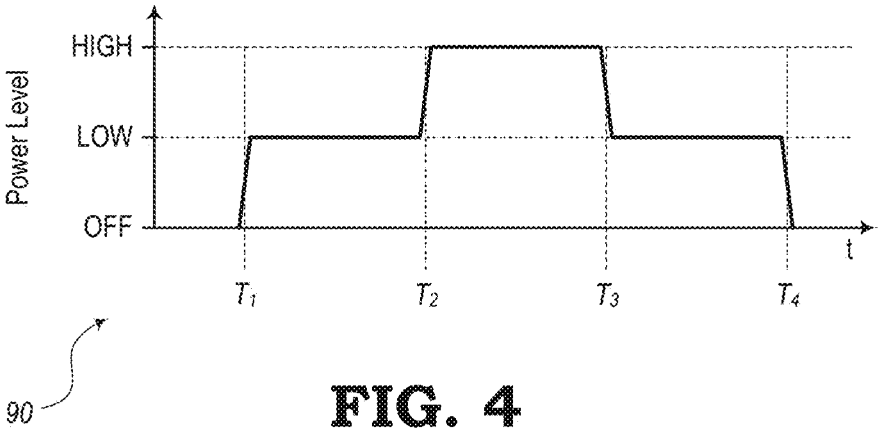
FIG. 4 is a graph illustrating an example of variable power output from a VFL, according to various embodiments.
Figure 5:
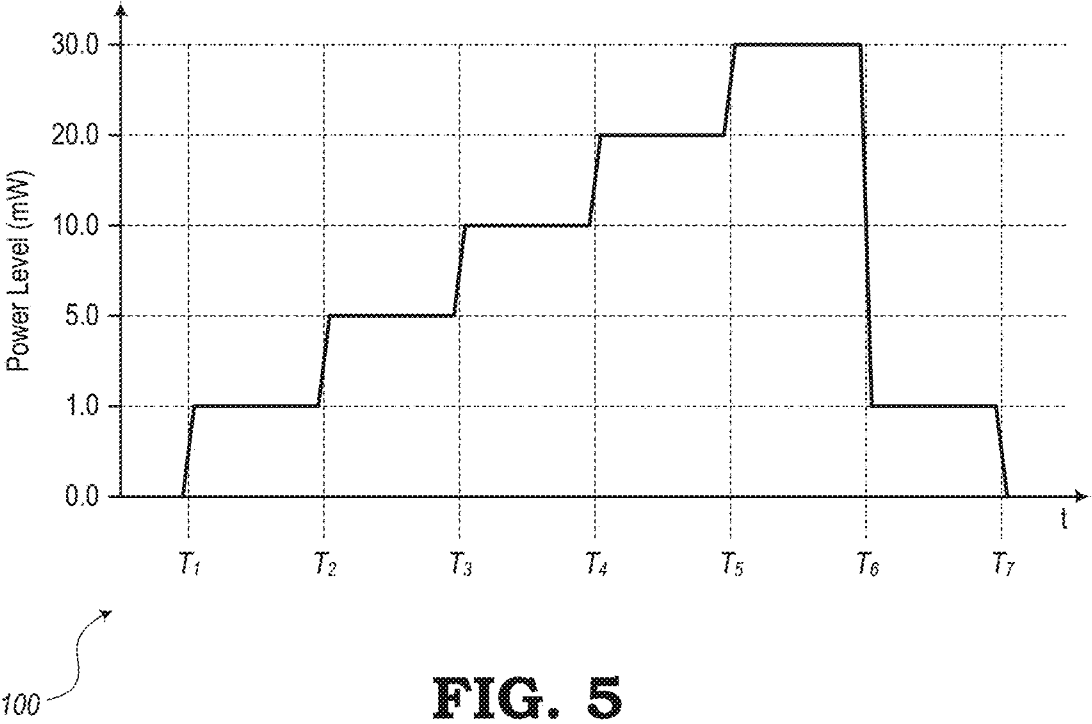
FIG. 5 is another graph illustrating another example of variable power output from a VFL, according to various embodiments.

The VFL 10*b* may be configured to continue to increase the power level, up to a certain limit, as long as the boost input button 24 remains pressed. This power level change may include a single jump to a higher level (as shown in FIG. 4) or may include a stepped pattern to multiple intermediate power levels (as shown in FIG. 5). In other embodiments, the power increase may be a gradual increase, up to a certain limit, based on how long the boost input button 24 remains pressed. In still other embodiments, the VFL 10*b* may be configured to increase to a next higher level each time the user presses the boost input button 24. Again, many other button pressing scenarios are anticipated by the inventors and are meant to be included in the present disclosure.

According to additional embodiments, the VFL 10*b* may also include a resume button 26, which may be used in conjunction with the boost input button 24 to enable the user to control the light intensity levels and/or power levels. As such, the VFL 10*b* may allow the user to press the boost input button 24 to increase the intensity of the light from the output port 14*b*. For example, the VFL 10*b* may be configured to enable the user to press and hold down the boost input button 24 to increase the light intensity level until a desired level is reached (either in a stepped or continuous manner). Then, within a predetermined amount of time, the user may press and hold down the resume button 26 to maintain the power or intensity level at that elevated level. In this way, the VFL 10*b* may operate at the elevated level as long as the user continues to hold down the resume button 26. Thus, the increase to higher levels may only be maintained when the user actively provides continuous input (e.g., continually presses down the resume button 26).

As shown in FIG. 1C, the VFL 10*c* may include a design or form factor of some handheld devices. When the output port 14*c* of the VFL 10*c* is connected to the connector 16 of the fiber optic cable 12 under test, the output port 14*c* is configured to emit the variable-power light to the fiber optic cable 12. In this embodiment, the VFL 10*c* includes at least an ON/OFF switch 30, an increase button 32, and a decrease button 34. When the user turns the power ON using the ON/OFF switch 30, the VFL 10*c* may emit light through one or more of the output ports 14*c* at a low light intensity level. If, for example, the user determines that the initial intensity level is not strong enough, the user may boost the power level by pressing the increase button 32. In some embodiments, pressing the increase button 32 once may boost the power to a next higher level (see FIG. 5). In other embodiments, the VFL 10*c* may be configured to boost the power in a continuous or linear manner when the user holds the increase button 32 down. Also, if the user notices, for example, that the light intensity is too high, the user can press the decrease button 34.

According to additional embodiments, the VFL 10*c* may also include a resume button 36, which may be used in conjunction with the increase button 32 and decrease button 34 to enable the user to control the light intensity levels and/or power levels. As such, the VFL 10*c* may allow the user to press the increase button 32 and decrease button 34 to obtain a desired level of light intensity. Then, within a predetermined amount of time, the user may press and hold down the resume button 36 to maintain the power or intensity level at the desired level. In this way, the VFL 10*c* may operate at the elevated level as long as the user continues to hold down the resume button 36. Thus, in this embodiment, the increase to higher levels may only be maintained when the user actively provides continuous input (e.g., continually presses down the resume button 36). The VFL 10*c* may also include a display screen 38 for displaying the power level.

It may be noted that this intentional increase is controlled by the user and is considered to be a safety feature with respect to conventional high-power devices that might unintentionally be powered on at a dangerous level. Thus, the VLFs 10 may prevent inadvertent emission of dangerously high light intensity levels. When the VFL 10 is turned on, its default power level is at a low safe level. However, when a boost is needed, the user may increase the power, upon an intentional request, by holding down the specific buttons 18, 24, 26, 36, etc. The VFL 10 may be configured to be increased to a next level after the user holds down the specific button for a predetermined amount of time (e.g., about one second, two seconds, etc.). In some embodiments, the VFL 10 may return the power to the initial safe (default) power level as soon as the specific button is released. In other embodiments, the VFL 10 may be designed to return to the default level when the user performs some other action, such as pressing the same or another button, double pressing the button, etc. In some embodiments, the predetermined time periods may be different from one level to the next, which again may be a safety feature for preventing the inadvertent change to a higher level than what might be desired.

Circuitry of Visual Fault Locators (VFLs)

Figure 2:
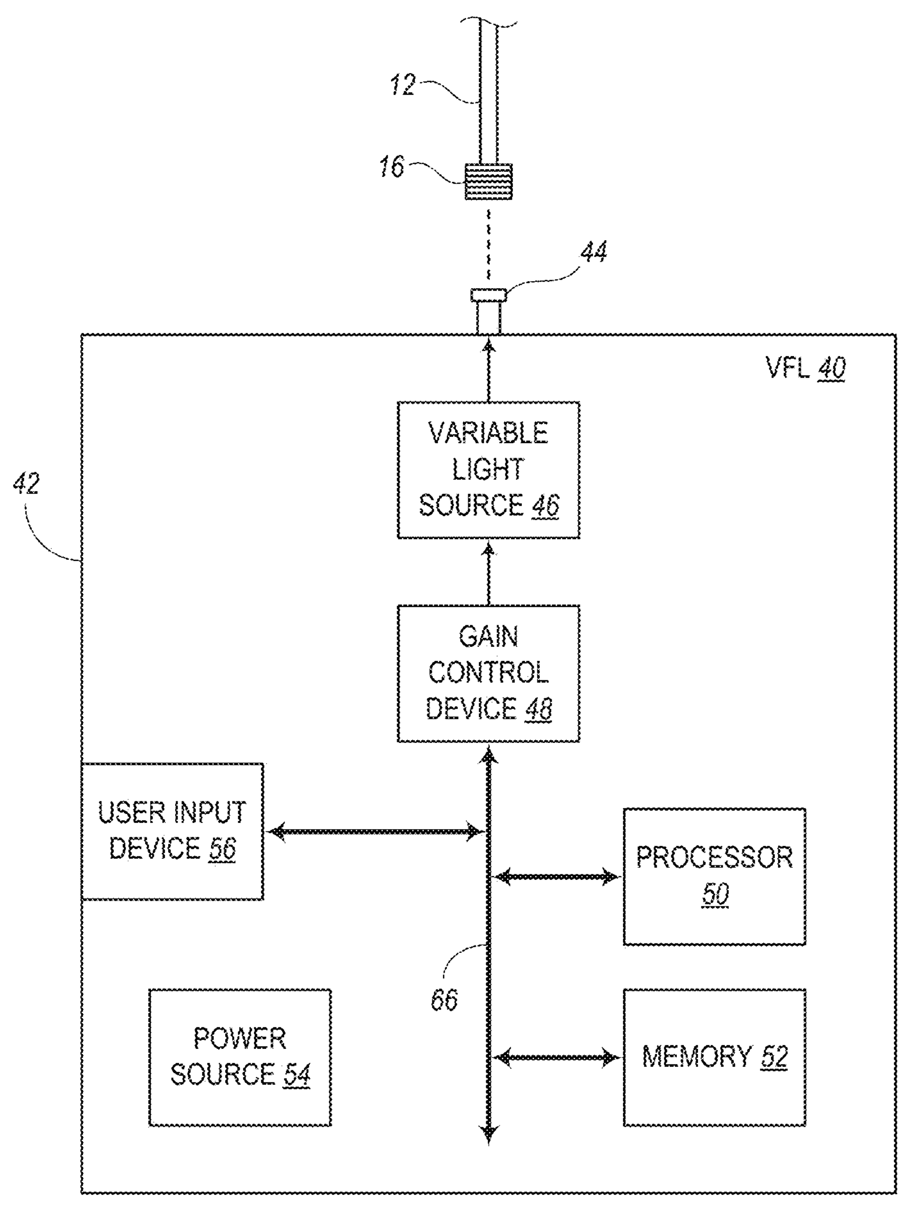
FIG. 2 is a block diagram illustrating a first schematic of a VFL, according to various embodiments.

FIG. 2 is a diagram illustrating an embodiment of a VFL 40 (e.g., VFL 10*a* of FIG. 1A). The VFL 40 includes a housing 42 and an output port 44 configured to be connected with a connector 16 of a fiber optic cable 12 to be tested. The VFL 40 further includes a variable light source 46 and a gain control device 48 provided within the housing 42. The VFL 40 also includes a processor 50, memory 52, a power source 54, and a user input device 56 (e.g., button, switch, etc.). It may be noted that this embodiment includes a simple design with only a single button or switch (e.g., user input device 56) for receiving user input with respect to power level changes. The gain control device 48, processor 50, memory 52, and user input device 56 may be interconnected via a bus interface 66 allowing the components 48, 50, 52, 56 to communicate with each other.

The functionality of varying the power level may be implemented in software (e.g., in the memory 52) and/or in hardware (e.g., in the processor 50). The processor 50 may be configured to perform the power changing functionality based on predefined code or logic. When the user presses or switches the user input device 56 in a particular fashion, the power source 54 may be configured to turn the VFL 40 ON by providing power to all the components within the housing 42. Also, pressing or switching the user input device 56 in a particular fashion, the processor 50 may be configured to instruct the gain control device 48 to change (e.g., increase or decrease) the power to the variable light source 46. The increase and decrease can be responsive to how the user presses the user input device 56 (e.g., the length of time that the user input device 56 is pressed, a sequence of multiple pressing actions, etc.) For example, in some embodiments, the user may press or switch the user input device 56 once to increase the power one level higher, two presses or switches for a power level two levels higher, etc. Then, by pressing and/or holding the user input device 56 in one position, the VFL 40 remains at the desired power level.

Figure 3:
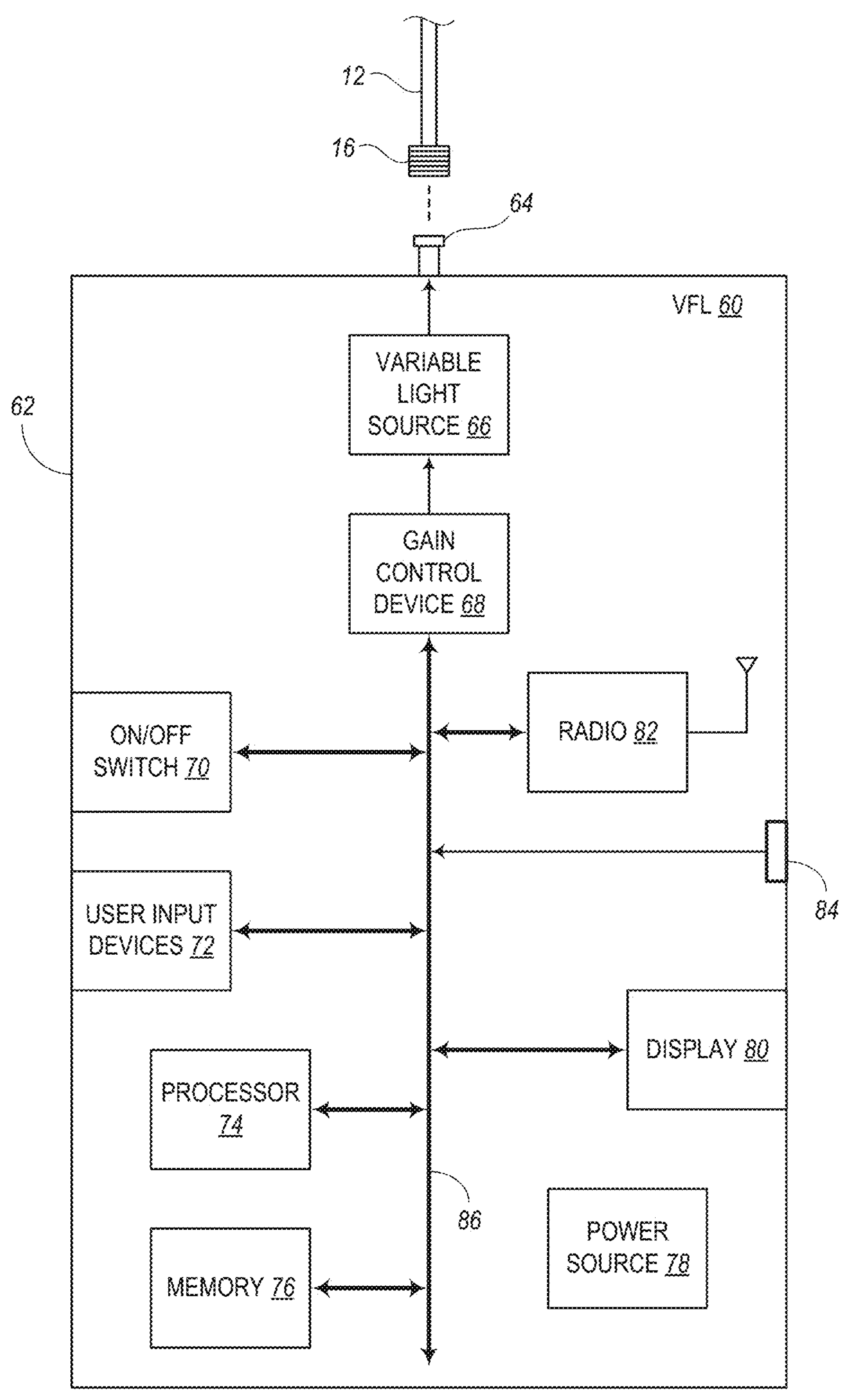
FIG. 3 is a block diagram illustrating a second schematic of a VFL, according to various embodiments.

FIG. 3 is a diagram illustrating another embodiment of a VFL 60 (e.g., VFL 10*b* of FIG. 1B, VFL 10*c* of FIG. 1C, etc.). The VFL 60 includes a housing 62 and an output port 64 configured to be connected with a connector 16 of a fiber optic cable 12 to be tested. The VFL 60 further includes a variable light source 66, a gain control device 68, an on/off switch 70, user input devices 72, a processor 74, memory 76, a power source 78, a display 80, a radio 82, and an external communication port 84, each interconnected via a bus interface 86 to enable communication with each other. In addition to the components described above with respect to FIG. 2, the VFL 60 includes multiple devices (e.g., on/off switch 70, user input devices 72, etc.) for enabling the user to enter inputs for arriving at a desired power level. The processor 74 communicates with the gain control device 68 to set the power level of the variable light source 66 to enable the variable light source 66 to provide the user-controlled level of power via the output port 64.

In some embodiments, the VFL 60 may not necessarily rely on a user to enter a desired power level. Instead, the VFL 60 may include devices for receiving external instructions from an external device. For example, the VFL 60 may operate in conjunction with another electronic device (e.g., mobile phone, computer, etc.) for setting the power level. The external device may be a wireless or mobile device and may communicate with the VFL 60 using wireless signals via the radio 82. In other embodiments, the external device may use a cable, connector, or other wired component that can be attached to the external communication port 84 (e.g., USB port, Ethernet port, etc.).

The VFLs 40, 60 may be digital computing devices that generally includes a processing device (e.g., processor 50, 74), a memory device (e.g., memory 52, 76), and Input/Output (I/O) interfaces (e.g., user input device 56, ON/OFF switch 70, user input devices 72, display 80, etc.). It should be appreciated that FIGS. 2 and 3 depict the VFLs 40, 60 in a simplified manner, where some embodiments may include additional components and suitably configured processing logic to support known or conventional operating features. The bus interfaces 66, 86 may allow the components to be communicatively coupled and may include one or more buses or other wired or wireless connections. The bus interfaces 66, 86 may also include controllers, buffers, caches, drivers, repeaters, receivers, among other elements, to enable communication.

The processors 50, 74 may include or utilize one or more generic or specialized processors (e.g., microprocessors, Central Processing Units (CPUs), Digital Signal Processors (DSPs), Graphics Processing Units (GPUs), etc.). Some or all functions of setting power levels may be implemented by a state machine that has no stored program instructions, or may be implemented in one or more Application-Specific Integrated Circuits (ASICs), in which each function or some combinations of certain of the functions are implemented as custom logic or circuitry. For some of the embodiments described herein, a corresponding device in hardware and optionally with software, firmware, and a combination thereof can perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, the memory 52, 76, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., processor 50, 74 or any type of programmable circuitry or logic) that, in response to such execution, enables or causes the one or more processors to perform a set of operations, steps, methods, processes, algorithms, functions, techniques, etc. as described herein for the various embodiments.

FIG. 4 is a graph 90 illustrating an example of power levels that may be reached in response to certain events (e.g., user activities) occurring over time. It may be noted that the power level axis is not necessarily drawn to scale. For example, the OFF power level may be 0.0 mW (milli-Watts), the LOW power level may have a value of about 1.0 mW to about 5.0 mW, and the HIGH power level may have a value of about 5.0 mW to about 30.0 mW. The graph 90 may be applicable to the execution of the various VFLs 10*a*, 10*b*, 10*c*, 40, 60 described in the present disclosure.

For example, the VFL may initially be OFF. Then, at time $T_1$, the user may press an ON/OFF button, flip an ON/OFF switch, or perform another action to power up the VFL. When the VFL is powered up, the gain control device 48, 68 may be configured to set the power level of the variable light source 46, 66 to LOW. At some time (i.e., time $T_2$) after being powered up, the VFL may be configured to emit light at the HIGH power level. There may be a delay (e.g., $T_2$ minus $T_1$) after some user action (e.g., continuously holding down a button for a certain number of seconds). At time $T_3$, another action may be detected, such as the user's release of the button. At this point, the power level may be dropped back down to the LOW level. Then, as time $T_4$, the user may turn off the device or a predetermined automatic power-off action may be executed.

FIG. 5 is a graph 100 illustrating another example of power levels in response to certain events occurring over time. It may be noted that the power level axis is neither drawn to scale nor logarithmic, but is shown for the purpose of describing various embodiments and functionality of the VFLs. It may also be noted that the embodiments of the present disclosure may be configured to generate output power at any number of power levels having any suitable power values. As shown in this example, the power levels may be 0.0 mW, 1.0 mW, 5.0 mW, 10.0 mW, 20.0 mW, and 30.0 mW In this graph 100, the power level can be increased to a next higher step, which may be indicative of user actions (e.g., pressing and holding down specific buttons, each press of other buttons, etc.). In some cases, a continuous holding down of certain buttons may result in a stepped increase in power. The time between each increase may be a constant time (e.g., one second, two seconds, etc.) or may be different between different power levels (e.g., one second to increase from 1.0 mW to 5.0 mW, two seconds to increase from 5.0 mW to 10.0 mW, 3.5 seconds to increase from 10.0 mW to 20.0 mW, and six seconds to increase from 20.0 mW to 30.0 mW). At time $T_6$, the button might be released (or some other user action may take place) to drop the power back down to a default level.

Testing Arrangements

Figure 6:
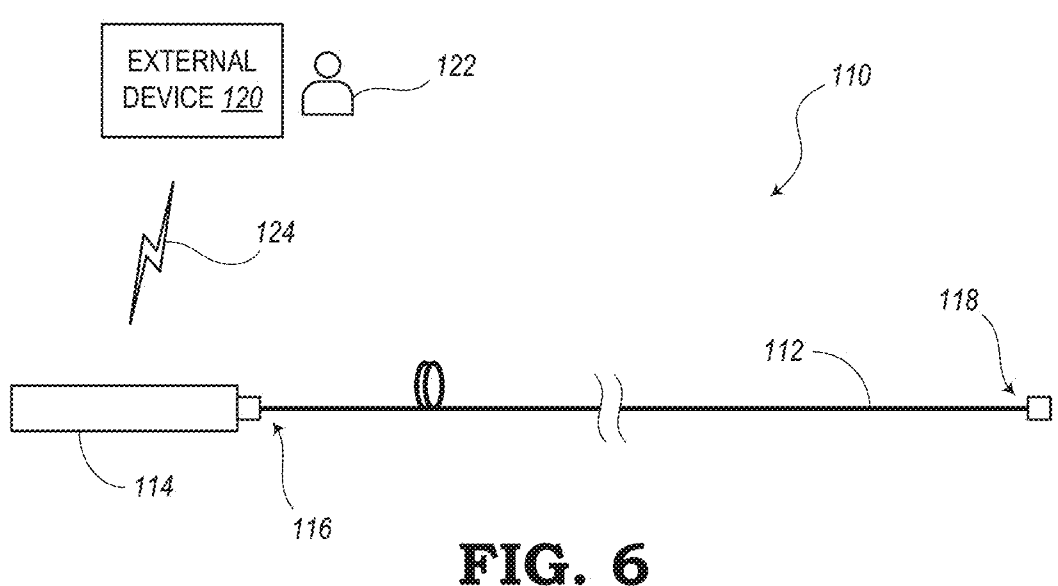
FIG. 6 is a diagram illustrating an arrangement for testing fiber optic cables involving one technician, according to various embodiments.

FIG. 6 is a diagram illustrating a test system 110 for testing a fiber optic cable 112 for faults. A VFL 114 (e.g., VFL 60) is connected to the fiber optic cable 112 at a first end 116 (e.g., a "near" end). In the case where there is a relatively small amount of attenuation and interference and there are few, if any, relatively minor faults, then light emission may be visually detectable at a second end 118 (e.g., a "far" end) of the fiber optic cable 112. The VFL 114 is configured to emit light into the first end 116 of the fiber optic cable 112 for testing and a sufficient amount of light is expected to exit the second end 118.

The test system 110 further includes an external device 120 that may be used by a technician 122. The external device 120 is configured to communicate with the VFL 114 over a communication channel 124. In some embodiments, the external device 120 may be a mobile phone, smart phone, portable electronic device, tablet, laptop computer, or another user device having wireless communication capabilities (e.g., Bluetooth functionality, Wi-Fi functionality, cellular functionality, among others, as well as any combinations thereof). In this case, the communication channel 124 is a wireless channel and the external device 120 may communicate wirelessly with wireless components (e.g., radio 82) of the VFL 114 via the communication channel 124. In other embodiments, the external device 120 may be a personal computer, tablet, or other user device having wired communication capabilities. In this case, the communication channel 124 may be an electrical cable (e.g., Ethernet cable or other physical connector) and the external device 120 may communicate with the VFL 114 (e.g., using the external communications port 84) via the communication channel 124. Thus, the communication channel 124 may be capable of wireless and/or wired communication.

In the arrangement of FIG. 6, the test system 110 may be set up where the technician 122 may be able to provide input to the external device 120 for controlling the power level of the VFL 114. The technician 122 may be positioned where he or she can view the first end 116 of the fiber optic cable 112 to visually observe issues with the connection to the VFL 114. Also, in this set-up, the technician 122 may be able to view the second end 118 of the fiber optic cable 112. For example, if the fiber optic cable 112 is wound up (e.g., on a spool), the technician 122 may be able to see both the first end 116 and the second end 118 relatively easily. In other scenarios, the technician 122 may be required to walk to another part of a room (e.g., within a data center), walk to another room (e.g., within the data center), and/or walk to another building if necessary. Nevertheless, it may be noted that the test system 110 may be arranged where one person (i.e., the technician 122) can perform the entire fault test by himself or herself.

Figure 7:
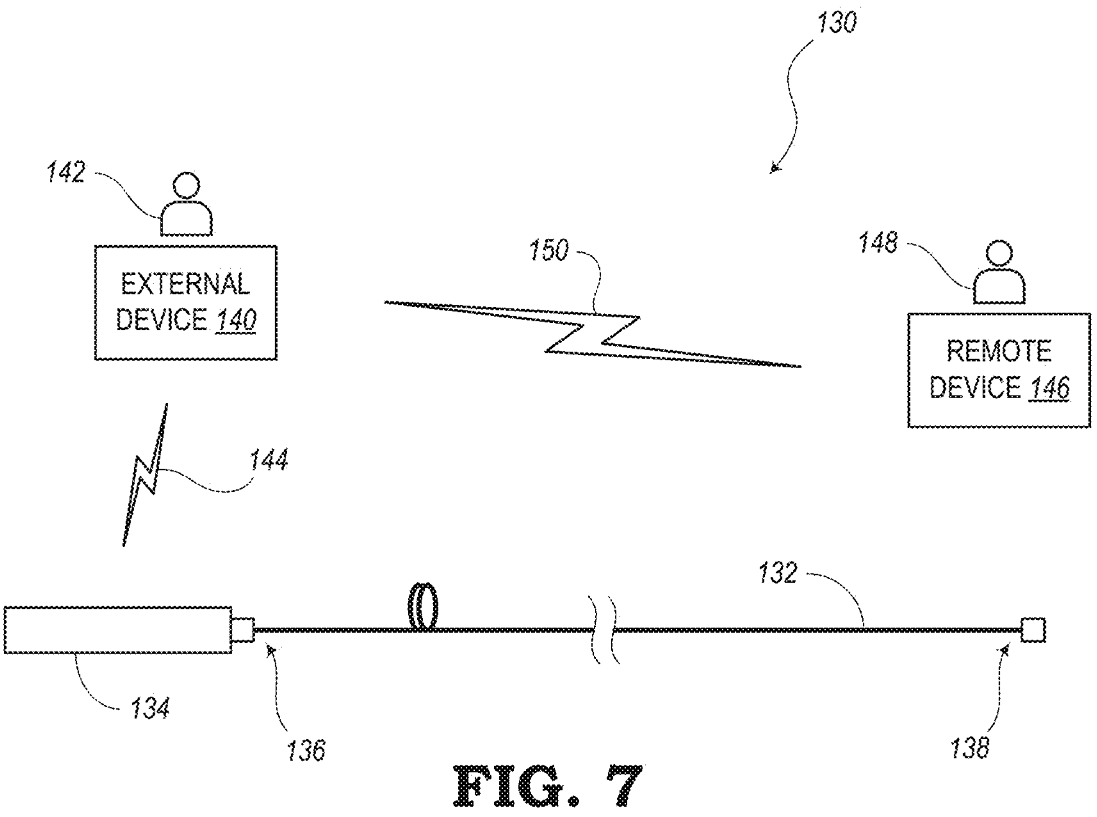
FIG. 7 is a diagram illustrating an arrangement for testing fiber optic cables involving two technicians, according to various embodiments.

FIG. 7 is a diagram illustrating a test system 130 for testing a fiber optic cable 132 for faults. A VFL 134 is connected to the fiber optic cable 132 at a first end 136 (e.g., a "near" end). In the case where there is a relatively small amount of attenuation and interference and there are few, if any, relatively minor faults, then light emission may be visually detectable at a second end 138 (e.g., a "far" end) of the fiber optic cable 132. The VFL 134 is configured to emit light into the first end 136 of the fiber optic cable 132 for testing and a sufficient amount of light is expected to exit the second end 138. Note, in an embodiment, the light can be unmodulated light. In another embodiment, the light can be modulated.

The test system 130 further includes an external device 140 that may be used by a first technician 142. The external device 140 is configured to communicate with the VFL 134 over a first communication channel 144 in the same manner as discussed with respect to FIG. 6. In the arrangement of FIG. 7, the test system 130 may be set up where the first technician 142 may be able to provide input to the external device 140, which may be used in some cases for at least partially controlling the power level of the VFL 134. The first technician 142 may be positioned where he or she can view the first end 136 of the fiber optic cable 132 to visually observe issues with the connection to the VFL 134. However, in this arrangement, the second end 138 of the fiber optic cable 132 may be "remote" from the first end 136, the external device 140, and the first technician 142. In this sense, the remote far end (e.g., second end 138) is not within a reasonable distance that would allow one person to complete the test.

As such, the test system 130 includes a remote device 146 that may be used by a second technician 148 who can view the second end 138 of the fiber optic cable 132 and/or can view other fibers and/or equipment that may be connected downstream of the second end 138. The remote device 146 may be a mobile phone, smart phone, computer, tablet, laptop, or other electronic device capable of communicating with the external device 140. In addition, another communication channel 150 in the test system 130 may be established between the external device 140 and the remote device 146. The communication channel 150 may be configured to exchange user input actions (for defining power changes) as well as audio signals (e.g., a voice call over cellular, Wi-Fi, and/or Internet media).

The VFL 134 can then be controlled by the two users, one at each end of the link. To be able to use the VFL 134 at the appropriate moment or at the right power level, the two users can communicate with each other over the communication channel 150. In some cases, one or both of the first technician 142 and second technician 148 may need extra time for making connection and setting up the test. If one is still performing other tasks and is not ready for the test to start, communication between the two can help to organize the timing and power levels needed.

The first technician 142 may be able to observe the condition of the fiber optic cable 132 at or near the first end 136 and observe whether the first end 136 is properly connected with the VFL 134. At about the same time, the second technician 148 may be able to observe the condition of the fiber optic cable 132 at or near the second end 138 and observe whether the second end 138 is properly connected to the next optical component in the optical network (if any). As such, the first technician 142 and second technician 148 may both be needed if the second end 138 is relatively far away from the first end 136 (e.g., 5 km or more).

Since potentially harmful light emission may be present at both the first end 136 and the second end 138 of the fiber optic cable 132, the present disclosure is configured to enable one or both of the technicians 142, 148 to control any increases in the power of the VFL 134. In some embodiments, the first technician 142 may perform user actions (e.g., similar to the processes of pressing and holding of buttons or switches as mentioned in other embodiments) with respect to the external device 140. These user actions may be communicated to the VFL 134 for controlling the power level, which again may be similar to the processes described throughout the present disclosure. In this case, the first technician 142 can provide the only control functions for setting the power level. In another embodiment, the second technician 148 may perform similar user actions with respect to the remote device 146 for setting power levels. The user actions (and power level settings) can be forwarded to the external device 140 via the communication channel 150 and then forwarded to the VFL 134. In other scenarios, both technicians 142, 148 may be able to provide input for controlling the power level. According to some embodiments, the test system 130 may require both technicians 142, 148 to perform certain actions simultaneously to enact the power changes. In other embodiments, the test system 130 may include allowing one technician to perform one or more actions and then allow the other technician to perform thereafter.

For local or remote control of the VFL state, the remote device 146 can be replaced with a test instrument with wireless capacity. One possible implementation is to add remote control to an advanced Live Fiber Detector (LFD) or similar instrument. The LFD uses a claw to grasp the outer jacket of the fiber to detect the actual light (e.g., outside the range of sight for human eyes) that is transmitted through it during normal operation of a communication network. In this type of implementation, the LFD user could manually turn the VFL ON or increase its output power manually for a certain period of time. If the LFD has the capacity to detect clipped VS release position, it could even be fully automated.

Conclusion

Therefore, the present disclosure describes various embodiments of VFLs capable of operating at different power levels. In a particular generalized implementation, a VFL may simply include a) an output port configured for connection with an optical fiber to be tested and b) a variable light source configured to emit visible light at different power levels from the output port. For example, the different power levels may correspond with different light intensity levels. In some embodiments, the VFL may be incorporated in a) a Live Fiber Detector (LFD), b) a photonic multiplexing/demultiplexing component, c) a photonic network component, or other devices.

According to additional embodiments, the VFL may also include a gain control device connected to the variable light source. The gain control device, for example, may be configured to control the power of the variable light source to enable the variable light source to emit the visible light at multiple power levels. The multiple power levels, for instance, may include one or more lower levels below class 2M and one or more high levels from class 3R or more. The gain control device may be configured to control the power of the variable light source based on user activity. The gain control device may increase the power of the variable light source from a low level to a high level when the user presses and holds down a boost button. Also, the gain control device may be configured to increase the power from the low level to the high level in multiple steps. The gain control device may also be configured to increase the power from one step to the next when the user continuously holds down the boost button for a predetermined amount of time. Furthermore, the gain control device may be configured to return the power to the low level when the user releases the boost button. In some embodiments, the boost button may also function as an on/off button.

In some embodiments, the VFL may further include one or more input devices for receiving command signals from an external device, whereby the command signals may be configured to control the power level of the variable light source. One input device may include a radio configured to wirelessly receive the command signals from the external device. Before receiving these command signals, the VFL may be configured to perform a pairing procedure to pair the external device with itself. The command signals received from the external device may include at least a continuation input for instructing the variable light source to maintain the power level at an elevated level. For example, the continuation input may be related to user activity associated with the external device. In some implementations, the command signals may be related to remote signals transmitted from a remote device in communication with the external device.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Visual Fault Locator (VFL) comprising:

an output port configured for connection with an optical fiber to be tested;

a variable light source configured to emit visible light at different power levels from the output port; and a gain control device connected to the variable light source, wherein the gain control device is configured to increase the power of the variable light source from a low level to a high level when the user presses and holds down a boost button.

2. The VFL of claim 1, wherein the multiple power levels include one or more lower levels below class 2M and one or more high levels from class 3R or more.

3. The VFL of claim 1, wherein the gain control device is configured to increase the power from the low level to the high level in multiple steps.

4. The VFL of claim 3, wherein the gain control device is configured to increase the power from one step to the next when the user continuously holds down the boost button for a predetermined amount of time.

5. The VFL of claim 1, wherein the gain control device is configured to return the power to the low level when the user releases the boost button.

6. The VFL of claim 1, wherein the boost button also functions as an on/off button.

7. The VFL of claim 1, further comprising one or more input devices for receiving command signals from an external device, wherein the command signals are configured to control the power level of the variable light source.

8. The VFL of claim 7, wherein the one or more input devices include at least a radio configured to wirelessly receive the command signals from the external device.

9. The VFL of claim 7, wherein, before receiving the command signals, the VFL is configured to perform a pairing procedure to pair the external device with the VFL.

10. The VFL of claim 7, wherein the command signals received from the external device include at least a continuation input for instructing the variable light source to maintain the power level at an elevated level, the continuation input related to user activity associated with the external device.

11. The VFL of claim 7, wherein the command signals are related to remote signals transmitted from a remote device in communication with the external device.

12. The VFL of claim 1, wherein the VFL is incorporated in one of a Live Fiber Detector, a photonic multiplexing/demultiplexing component, and a photonic network component.

13. A control device comprising a processor and memory configured to store computer logic having instructions that, when executed, enable the processor to perform the steps of:

obtaining control input from a user via a boost button; and communicating the control input to a Visual Fault Locator (VFL) having a variable light source and an output port, wherein the control input causes the VFL to change a power level of the variable light source resulting in a change of light intensity emitted from the output port to a near end of an optical fiber under test, wherein the control device is configured to increase the power of the variable light source from a low level to a high level when the user presses and holds down the boost button.

14. The control device of claim 13, wherein the step of communicating the control input to the VFL includes communicating wireless to a radio of the VFL.

15. The control device of claim 13, wherein the step of obtaining control input from the user includes receiving the control input from a remote device located near a far end of the optical fiber under test.

16. The control device of claim 15, wherein the step of obtaining control input from the user further includes receiving additional control input from another user associated with the control device and using the control input and additional control input to control the power level of the variable light source of the VFL.

* * * * *